United States Patent
Guisasola (10) Patent No.: US 12,023,788 B2
(45) Date of Patent: Jul. 2, 2024

(54) DEVICE FOR TENSIONING A CONNECTING ELEMENT

(71) Applicant: Caterpillar Energy Solutions GmbH, Mannheim (DE)

(72) Inventor: Inigo Guisasola, Landau (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 456 days.

(21) Appl. No.: 17/416,914

(22) PCT Filed: Dec. 20, 2019

(86) PCT No.: PCT/EP2019/025475
§ 371 (c)(1),
(2) Date: Jun. 21, 2021

(87) PCT Pub. No.: WO2020/126098
PCT Pub. Date: Jun. 25, 2020

(65) Prior Publication Data
US 2022/0040835 A1 Feb. 10, 2022

(30) Foreign Application Priority Data
Dec. 21, 2018 (GB) .................................... 1821003

(51) Int. Cl.
*B25B 29/02* (2006.01)
*F16B 31/04* (2006.01)

(52) U.S. Cl.
CPC ............ *B25B 29/02* (2013.01); *F16B 31/043* (2013.01)

(58) Field of Classification Search
CPC .......... B25B 29/02; F16B 31/043; B23P 19/06
See application file for complete search history.

(56) References Cited

U.S. PATENT DOCUMENTS

| 4,391,431 A | 7/1983 | Maximov |
| 7,055,408 B2 * | 6/2006 | Sasaki ..................... B23P 19/06 81/433 |

(Continued)

FOREIGN PATENT DOCUMENTS

| CN | 202399224 U | 8/2012 |
| CN | 105026782 | 11/2015 |

(Continued)

OTHER PUBLICATIONS

International Search Report related to Application No. PCT/EP2019/025475, dated Mar. 27, 2020.

(Continued)

*Primary Examiner* — David B. Thomas (57) ABSTRACT

The present invention refers to a device for tensioning a connecting element fastened to a component to be tightened, comprising a fixation element for holding the connecting element; a support element for supporting the device against the component; and an actuating unit with a fluid chamber for receiving a fluid and a piston which is translationally guided in the fixation element. The actuating unit is configured for manipulating a volume of the fluid chamber by translationally actuating the piston so as to move the fixation element relative to the support element. The piston is coupled to the fixation element by means of at least one ball or roller screw.

14 Claims, 2 Drawing Sheets

(56) References Cited

U.S. PATENT DOCUMENTS

| | | |
|---|---|---|
| 9,168,644 B2 | 10/2015 | Imi |
| 9,375,815 B2 | 6/2016 | Faus et al. |
| 9,878,430 B2 * | 1/2018 | Hohmann ............... B25B 29/02 |
| 9,989,115 B2 * | 6/2018 | Suzuki .................... F16D 65/52 |
| 11,207,767 B2 * | 12/2021 | Guisasola ............... B25B 29/02 |
| 2016/0271781 A1 * | 9/2016 | Kobayashi ............. F16H 25/20 |
| 2016/0303723 A1 * | 10/2016 | Franz ...................... B25F 5/021 |
| 2018/0058554 A1 | 3/2018 | Huebner et al. |
| 2019/0040939 A1 | 2/2019 | Matsuto et al. |

FOREIGN PATENT DOCUMENTS

| | | |
|---|---|---|
| CN | 105563100 B | 10/2017 |
| CN | 108080936 | 5/2018 |
| CN | 111645138 | 9/2020 |
| EP | 2871027 A1 | 5/2015 |
| EP | 3323555 A1 | 5/2018 |
| WO | 2015189015 A1 | 12/2015 |
| WO | 2016150434 A2 | 9/2016 |
| WO | 2017016654 A1 | 2/2017 |

OTHER PUBLICATIONS

Great Britain Search Report related to Application No. 1821003.9, dated May 14, 2019.

* cited by examiner

DEVICE FOR TENSIONING A CONNECTING ELEMENT

This patent application is a 35 USC § 371 U.S. national stage of International Application No. PCT/EP2019/025475 filed on Dec. 20, 2019, which claims the benefit and priority of Great Britain Application No. 1821003.9 filed on Dec. 21, 2018, the disclosures of which are incorporated in their entirety by reference herein.

TECHNICAL FIELD

The present invention refers to a device for tensioning and/or loosening a tensable connecting element, such as a screw connection, fastened to a component to be tightened or loosened.

TECHNOLOGICAL BACKGROUND

Tensable connecting elements, such as tensable screw connections, for tightening or connecting components are well known. Specifically, for installing such tensable connecting elements, the use of screw tensioning devices is known, for example, in the field of steel constructions and various engine design applications. These screw tensioning devices generally operate based on a torque-free tensioning method, according to which pulling forces are used to lengthen large screws or bolts in an elastic range during installation such that, upon releasing the pulling forces, the connecting elements retract and thereby apply tensional forces onto the components to be tightened.

For example, in a known use of the screw tensioning devices, at first, a first end of a screw is connected to a first component via a threaded means. Then, a second component to be fastened to the first component is provided such that a threaded rod of the screw extends therethrough. Via a second end of the screw, a nut is placed on the screw so as to be engaged with the threaded rod. Thereafter, the second end of the screw is engaged with the screw tensioning device and a pulling force is applied thereto so as to elastically lengthen the screw. In this lengthened state, the nut is further tightened such that, upon releasing the pulling force applied to the screw, the screw together with the nut apply a tensional force for frictional connecting the first to the second component.

Such a screw tensioning device, for example, is known from EP 323 555 A1. In the known device, hydraulically induced pulling forces are used for tensioning a screw connecting element engaged with a fixation element of the device. Specifically, the known device comprises a support element configured to support the fixation element against a component to be tightened during tensioning operation. The fixation element is arranged to be movable relative to the support element so as to apply tension or to remove tension from the screw. Further, a piston is provided which is accommodated and movable within the fixation element along a longitudinal axis of the device. For hydraulically actuating the fixation element, a hydraulic chamber containing a fluid is delimited by and provided in a space between the piston, the fixation element and the support element. In this configuration, the piston is arranged such that a translational movement thereof relative to the fixation element manipulates a volume of the fluid chamber and thereby translationally actuates the fixation element relative to the support element.

Specifically, the fluid chamber comprises two distinct portions, a piston portion delimited by and provided between the piston and the fixation element and an effective portion delimited by and provided between the fixation element and the support element which are fluid-communicatively connected via two connecting bores provided in the fixation element. In this configuration, the effective portion is disposed around the fixation element along a circumferential direction thereof and has an effective base area that is considerably larger compared to an effective base area of the piston portion. The actuating force applied onto the piston is hydraulically transformed into a force acting on the fixation element which is higher compared to that one acting on the piston. By this configuration, an actuating force acting on the piston is transformed into a higher pulling force acting on the screw. In this way, the pulling force for tensioning the screw is generated by multiplying the actuating force applied to the piston.

For actuating the piston, the known device is equipped with an actuator assembly including an actuator element connected to an end portion of the piston by means of a threaded engagement such that a rotational movement of the actuating element is transferred into a translational movement of the piston relative to the fixation element.

SUMMARY OF THE INVENTION

In view of the prior art, it is an objective to provide an improved device for tensioning a connecting element. An additional object may be to provide a device with a high operational safety and durability.

This object is solved by means of a device for tensioning a connecting element having the technical features of claim 1. Preferred embodiments are set forth in the present specification, the Figures as well as the dependent claims.

Accordingly, a device is provided for tensioning a connecting element fastened to a component to be tightened which comprises a fixation element for holding the connecting element; a support element for supporting the device against the component to be tightened; and an actuating unit having a fluid chamber for receiving a fluid and a piston which is translationally guided in the fixation element. The actuating unit is configured for manipulating a volume of the fluid chamber by translationally actuating the piston, i.e. relative to the fixation element, so as to move the fixation element relative to the support element. The piston is coupled to the fixation element by means of at least one ball or roller screw.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

In the following, the invention will be explained in more detail with reference to the accompanying Figures. In the Figures, like elements are denoted by identical reference numerals and repeated description thereof may be omitted in order to avoid redundancies.

Figure 1:
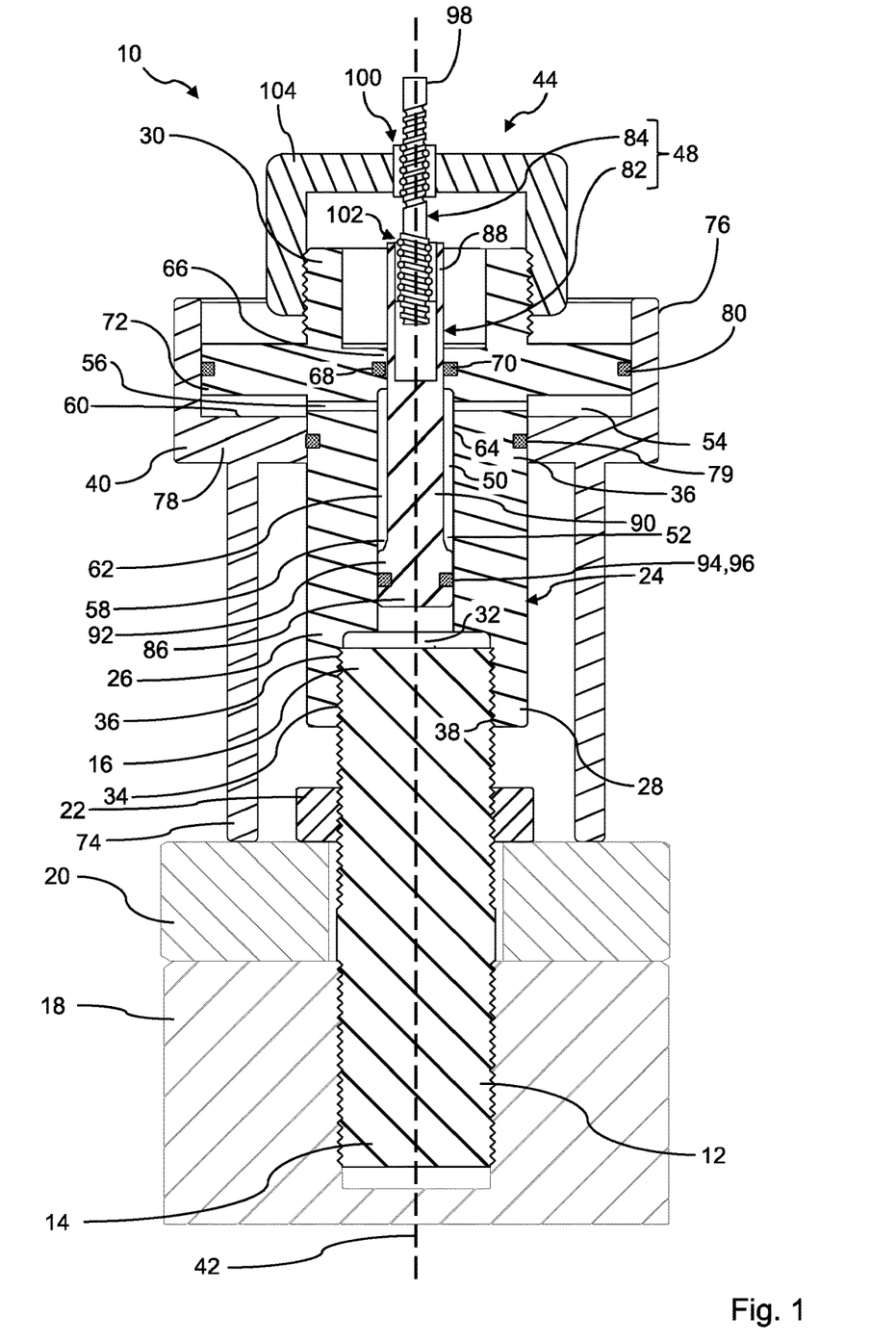
FIG. 1 schematically shows a sectional view of a device for tensioning a connecting element, and FIG. 2 schematically shows an enlarged view of a piston of the device depicted in FIG. 1.

FIG. 1 schematically shows a device 10 for tensioning a connecting element 12 which forms a screw connection. The shown device 10 may be used for tensioning, i.e. preloading, and/or loosening, i.e. untighten, tensable screw connections. In the context of the present disclosure, the term "tensable" refers to a material property indicating that a component, i.e. the connecting element 12, at least partially, is capable of being elastically expanded and thus of storing an amount of elastic energy when being subjected to a tensioning force.

Specifically, the connecting element 12 is provided in the form of a screw comprising a first end 14, an opposed second end 16 and an elastic part positioned between the first end 14 and the second end 16. The elastic part is capable of being elastically lengthened when the connecting element 12 is subjected to a pulling force by means of the device 10.

The connecting element 12 is configured for connecting, i.e. for form- and/or force-fittingly connecting, a first component 18 to a second component 20. Specifically, the first end 14 of the connecting element 12 is configured to be connected to the first component 18 by means of a threaded engagement, as depicted in FIG. 1. The elastic part of the connecting element 12 extends through the second component 20 such that the second end 16 of the connecting element 12 is positioned on a side of the second component 20 facing away from the first component 18. For connecting the first and the second component 18, 20, a nut 22 is provided which is in threaded engagement with the elastic part of the connecting element 12.

The device 10 comprises a fixation element 24 connectable the connecting element 12. Specifically, the fixation element 24 includes a cylindrical portion 26 having a first end 28 and a second end 30. At the first end 28, the fixation element 24 is provided with a fixation section for receiving and holding the connecting element 12, i.e. the second end 16 thereof. In other words, the fixation section is provided for engaging with the connecting element 12 in a force- and/or form-fitting manner. Specifically, the fixation section includes a cylindrical recess 32 to house the second end 16 of the connecting element 12 and internal threads 34 formed on a side wall 36 of the recess 32 to engage with complementary threads 38 formed at the second end 16 of the connecting element 12.

Further, the device 10 comprises a support element 40 configured to support the device 10 against the second component 20 and to translationally guide the fixation element 24 relative to the first and second component 18, 20. In other words, the fixation element 24 is translationally movable relative to the support element 40, i.e. along a longitudinal axis 42 of the device. Specifically, upon translationally moving the fixation element 24 relative to the support element 40, a tensioning force may be applied to or may be removed from the connecting element 12 fixed to the fixation element 24.

The device 10 further comprises an actuating unit 44 for translationally actuating the fixation element 24 relative to the first and second component 18, 20 to be tightened and thus relative to the support element 40. In the following, the structure and operation of the actuating unit 44 will be further specified.

The actuating unit 44 is at least partly hydraulically actuated. In other words, a hydraulic fluid is used to transfer motive power so as to move the fixation element 24 relative to the support element 40. Specifically, the actuating unit 44 comprises a fluid chamber 50 accommodating the fluid, wherein the actuating unit 44 is configured to manipulate a volume of the fluid chamber 50 so as to move the fixation element 24 relative to the support element 40. For doing so, the actuating unit 44 is provided with a piston 48 partially accommodated within and movable relative to the fixation element 24, i.e. along the longitudinal axis 42. In the shown configuration, the fluid chamber 50 is delimited by the piston 48, the fixation element 24 and the support element 40.

The actuating unit 44 is designed such that a translational movement of the piston 48 manipulates the volume of the fluid chamber 50 and thereby moves the fixation element 24 with respect to the support element 40 so as to apply or remove a tension acting on the connecting element 12 connected to the fixation element 24.

More specifically, the fluid chamber 50 comprises two distinct portions, a piston portion 52 delimited by and provided between the piston 48 and the fixation element 24 and an effective portion 54 delimited by and provided between the fixation element 24 and the support element 40. The piston portion 52 and the effective portion 54 are fluid-communicatively connected via two connecting bores 56 provided in the fixation element 24. A base area 58 of the piston portion 52 is provided with an effective cross section that is smaller than an effective cross section of a base area 60 of the effective portion 54. In this context, the "effective cross section" refers to an area that is perpendicular to the longitudinal direction 42 and thus perpendicular to a moving direction of both the piston 48 and the fixation element 24 relative to the support element 40. By this configuration, an actuating force applied onto the piston 48 is hydraulically transformed into a force acting on the fixation element 24 that is higher compared to the actuating force acting on the piston 48.

For accommodating the piston 48, the fixation element 24 further includes a bore 62 extending along the longitudinal axis 42 of the device 10. Specifically, the bore 62 extends from the second end 30 of the cylindrical portion 26 to the recess 32 formed at the first end 28 of the cylindrical portion 26 of the fixation element 24 and is configured to receive the piston 48. A diameter of the bore 62 may be less than the diameter of the recess 32 which thus together form a stepped opening within the fixation element 24. Further, the bore 62 includes a variable diameter along the longitudinal axis 42. In other words, a wall of the fixation element 24 has a variable width along the length of the bore 62 such that the diameter of the bore 62 changes along the length of the bore 62. As depicted in FIG. 1, the bore 62 includes a wider portion 64 and a narrower portion 66. At the wider portion 64, a distance between the piston 48 and the wall of the fixation element 24 is greater than at the narrower portion 66.

As shown in FIG. 1, at the narrower portion 66, the piston 48 contacts the wall of the fixation element 24. The narrower portion 66 includes a groove 68 formed in the wall of the fixation element 24 which extends along a perimeter of the bore 62. A first sealing ring 70 is disposed in the groove 68 to form a seal joint between the piston 48 and the fixation element 24. The first sealing ring 70 is positioned between the piston 48 and the wall of the fixation element 24.

The fixation element 24 also includes a plate 72 extending radially from the cylindrical portion 26 of the fixation element 24. The plate 72 is positioned normal to the longitudinal axis 42 and is proximal to the second end 30 of the fixation element 24. The plate 72 is cylindrical in shape and forms a flange portion in proximity to the second end 30 of the fixation element 24.

The fixation element 24 is received at least partly within the support element 40. As set forth above, the fixation element 24 is arranged and adapted to be moved relative to the support element 40 to apply tension to or remove tension from the connecting element 12. The support element 40 includes a first cylindrical portion 74 and a second cylindrical portion 76 connected to one another by a connection portion 78. The first cylindrical portion 74 forms a lower part of the support element 40 to be positioned on the second component 20. Further, the first cylindrical portion 74 surrounds a part of the connecting element 12, the first end 28 of the fixation element 24 and a portion of the cylindrical portion 26 of the fixation element 24. Specifically, the first cylindrical portion 74 surrounds the portion of the cylindrical portion 26 which is positioned underneath the plate 72 in the illustration depicted in FIG. 1.

The second cylindrical portion 76 is spaced away from the first cylindrical portion 74 by the connection portion 78. The second cylindrical portion 76 surrounds the plate 72 of the fixation element 24 such that an inner surface of the second cylindrical portion 76 contacts an outer surface of the plate 72. In other words, the plate 72 is positioned within the second cylindrical portion 76 of the support element 40 and is configured to move relative to the second cylindrical portion 76.

As can be gathered from FIG. 1, the first cylindrical portion 74, the second cylindrical portion 76, and the connection portion 78 are hollow cylindrical portions having inner diameters different from each other, thereby forming stepped configurations with each other. The inner diameter of the connection portion 78 is smaller than the inner diameters of both the first cylindrical portion 74 and the second cylindrical portion 76. The connection portion 78 comprises an opening to guide the fixation element 24 within the support element 40, which opening has a diameter slightly larger than the diameter of the portion of the fixation element 24 guided by the support element 40. The connection portion 78 may further define a recess in which a second sealing ring 79 may be disposed for providing a sealing between the fixation element 24 and the connection portion 78.

Further, a third sealing ring 80 is positioned between the inner surface of the second cylindrical portion 76 and the outer surface of the plate 72 to prevent leakage of the fluid accommodated in the fluid chamber 50. Specifically, the third sealing ring 80 may be positioned in a groove formed either into the inner surface of the second cylindrical portion 76 or into the outer surface of the plate 72, as depicted in FIG. 1.

The plate 72, the connection portion 78, and the second cylindrical portion 76 of the support element 40 together form the effective portion 54 of the fluid chamber 50. The effective portion 54 is fluidly connected to the bore 62 in the fixation element 24 via the connecting bores 56. The effective portion 54 is configured to receive the fluid from the piston portion 52 accommodated in the bore 62 of the fixation element 24 due to an axial movement of the piston 48 slidably positioned within the fixation element 24.

In this way, the fluid may move back and forth between the piston portion 52 and the effective portion 54 of the fluid chamber 50. During operation, the position of the piston 48 determines how much fluid is displaced from the piston portion 52 to the effective portion 54, and vice versa. As can be gathered from FIG. 1, when the piston 48 is moved in an upward direction, i.e. in a direction facing away from the fixation element 24, the size of the piston portion 52 gets smaller. Accordingly, fluid is displaced therefrom into the effective portion 54 causing an increase of pressure in the effective portion 54 as more and more fluid enters thereinto. This pressure acts on the fixation element 24, thereby causing it to move in a direction facing away from the support element 40, i.e. along the longitudinal axis 42. This movement induces tensioning and thus lengthening of the connecting element 12. In this tensioned and lengthened state of the connecting element 12, an operator may tighten the nut 22 so as to position the nut 22 closer to the second component 20, i.e. to abut on the second component 20. This may be performed by reaching the nut 22 through openings in the support element 40 with a tool, an end of which may be inserted into the openings at the side of the nut 22 to turn and thus tighten or loosen the nut 22.

In the shown configuration, the piston 48 is provided in the form of an assembly built up from a piston section 82 and an actuating section 84 releasably engaged with one another.

The piston section 82 forms a part of the piston 48 that partially defines and delimits the fluid chamber 50. The piston section 82 has a rotationally symmetric outer shape with a head end 86 and a rod end 88 that are distal to one another and connected by a shaft 90. The head end 86 has a sealing portion 92 that is larger in diameter than the shaft 90. The diameter of sealing portion 92 corresponds to a diameter of the bore 62 in the fixation element 24. The sealing portion 92 comprises a recess 94 that is circular in nature. A fourth sealing ring 96 is provided within the recess 94. The first to fourth sealing ring 70, 79, 80, 96 may be made from metal, such as iron or steel, ceramics, fibrous materials, elastomer and/or plastic.

The actuating section 84 constitutes a user interface intended for being manipulated by the operator to operate the device 10. Accordingly, at a first end, the actuating section 84 comprises an interface element 98 protruding from the fixation element 24 and thus being exposed so as to ensure a good accessibility for the operator. For example, the interface element 98 may be provided with a hexagonal recess for engagement with a tool to be used by the operator, i.e. a manual or electric screwdriver.

Specifically, the actuating unit 44 is configured to transform a rotational movement of the actuating section 84 into a translational movement of the piston section 82 which manipulates the volume of the fluid chamber 50 and thereby moves the fixation element 24 with respect to the support element 40. As a result, upon rotationally manipulating the actuation section 84, a tensioning or loosening of the connecting element 12 connected to the fixation element 24 is performed by means of the device 10.

For ensuring tightness of the fluid chamber 50 even for long operating periods of the device 10, it has been found that wear of sealing rings 70 and 96 may be significantly reduced by preventing the piston section 82 from being rotated relative to the fixation element 24. Accordingly, the proposed device further comprises a guiding unit (not shown) configured to lock a relative rotational movement between the piston section 82 and the fixation element 24.

For enabling that the piston section 82 is translationally moved upon rotationally actuating the actuating section 84, the device 10 is equipped with a first ball screw 100 and a second ball screw 102 for supporting and connecting the piston 48 within the device 10, i.e. the fixation element 24. Specifically, the first and the second ball screw 100, 102 serve as a bearing for the piston 48 within the device 10 and as a linear actuator for transforming a rotational movement of the actuating section 84 into a translational movement of the piston section 82.

Although in the shown configuration two ball screws 100, 102 are used for supporting the piston 48 within the device 10, alternatively, two roller screws may be used.

Generally, the term "ball screw" refers to a mechanical linear actuator for transferring rotational motion into linear motion, or vice versa. Ball screws make use of ball bearings provided between and engaged with a screw and a complementary designed nut which form a helical raceway for the ball bearings. Unlike conventional threaded connections, in this configuration, a form-fit connection is not provided directly between the complementary threads of the screw and nut, but rather by means of the ball bearings arranged therebetween. As a result, such connections are capable of withstanding high loads at minimum internal friction.

Further, the term "roller screw" refers to another type of mechanical linear actuator for transferring rotational motion into linear motion, or vice versa. Such mechanical linear actuators may also be referred to as planetary roller screws or satellite roller screws. Compared to ball screws, roller screws make use of rollers as the load transfer elements between screw and nut instead of ball bearings. Specifically, a roller screw comprises a plurality of threaded planetary rolls engaged with the screw and the nut, wherein the screw provides a helical raceway for the rollers which are radially arrayed around the screw and encapsulated by the nut. Due to its design, roller screws may be more expensive, but suitable for withstanding higher loads compared to ball screws.

Figure 2:
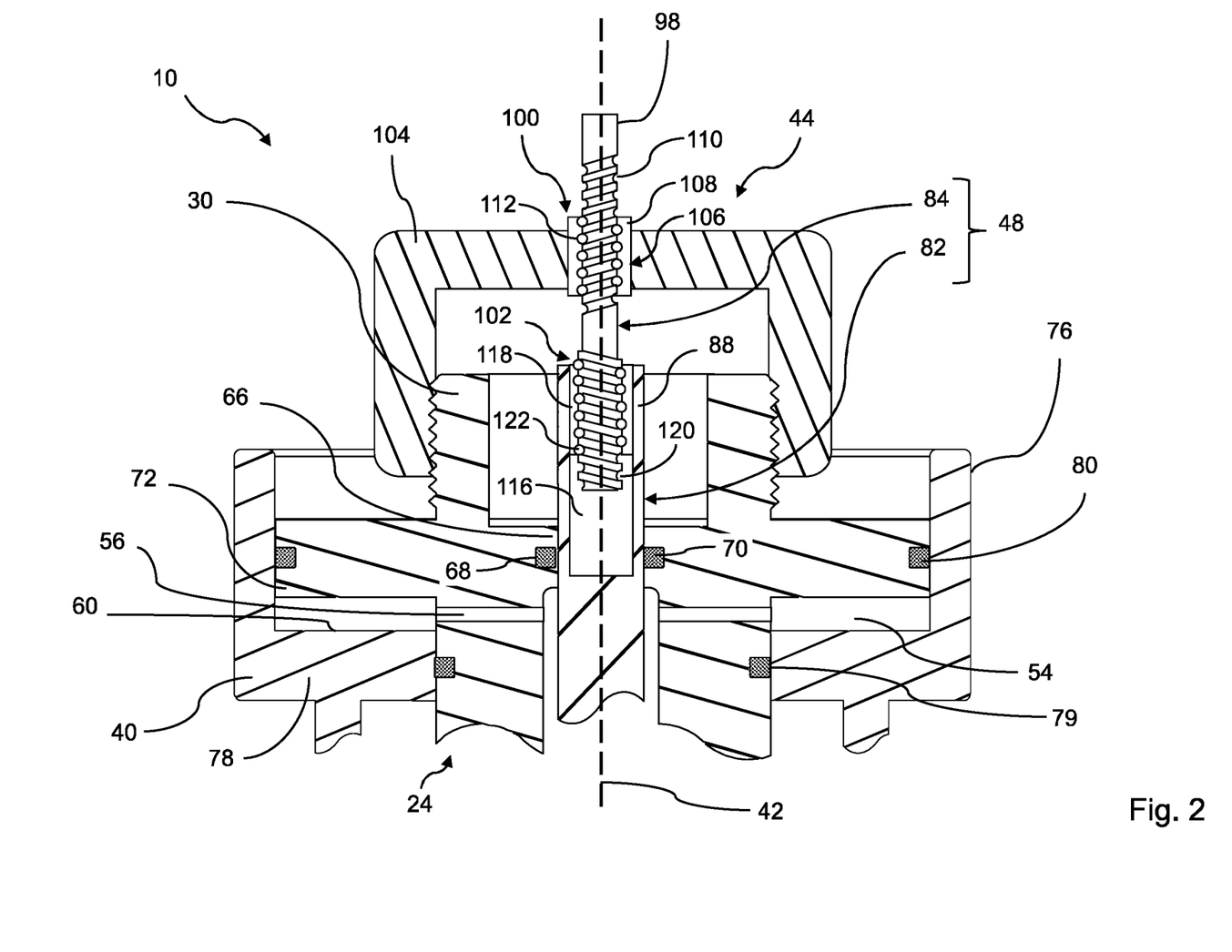

As can be gathered from FIG. 2, the first ball screw 100 is interposed between the fixation element 24 and the actuating section 84 such that it is directly connected to both the fixation element 24 and the actuating section 84. The fixation element 24 comprises a cap 104 mounted to a main body of the fixation element 24 by means of a threaded connection. The cap 104 is provided with a first recess 106 in the form of a through hole for accommodating the first ball screw 100. Specifically, a first nut 108 of the first ball screw 100 is fixed to an inner side wall the first recess 106. The first nut 108 accommodates the actuating section 84 such that it extends therethrough. In this configuration, the actuating section 84 forms or constitutes a first screw of the first ball screw 100. For doing so, the actuating section 84 is provided with a first helical thread 110 which, together with a complementary helical thread provided in the first nut 108, forms a helical raceway for first ball bearings 112 received in the first ball screw 100.

Further, the piston section 82 is engaged to the actuating section 84 by means of the second ball screw 102. Specifically, the second ball screw 102 is interposed between the piston section 82 and the actuating section 84. For accommodating the second ball screw 102, the piston section 82, at its rod end 88, is provided with a second recess 116. Specifically, a second nut 118 of the second ball screw 102 is fixed to an inner side wall the second recess 116. The second nut 118 accommodates an end portion of the actuating section 84 which is arranged opposed to the interface element end 98 thereof. In this configuration, the actuating section 84 forms or constitutes a second screw of the second ball screw 102. For doing so, the actuating section 84 is provided with a second helical thread 120 which, together with a complementary helical thread provided in the second nut 118, forms a helical raceway for second ball bearings 122 received in the second ball screw 102. In an alternative configuration, the actuating section 84 may be provided with the second recess so as to accommodate the second ball screw 102, in which a rod end of the piston section 82 may be received. Accordingly, a nut of the second ball screw 102 may be fixed to an inner side wall of the second recess and the piston section 82 may form or constitute a screw of the second ball screw.

In the shown configuration, the first thread 110 is a left hand thread and the second thread 120 is a right hand thread. Alternatively, the first thread 110 may be a right hand thread and the second thread 120 may be a left hand thread. Further, the first and the second thread 110, 120 may either be a left or a right hand thread, respectively.

In an alternative configuration, one of the first and the second ball screw 100, 102 may be replaced by a form-fit connection for enabling a relative rotational movement between the actuating section 84 and the fixation element 24 or the piston section 82, while a relative translational movement between these components may be locked.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

This is in particular the case with respect to the following optional features which may be combined with some or all embodiments, items and/or features mentioned before in any technically feasible combination.

A device may be provided for tensioning a connecting element fastened to a component to be tightened. The device may comprise a fixation element for holding the connecting element, a support element for supporting the device against the component, and an actuating unit with a fluid chamber and a piston. The fluid chamber may be configured for receiving a fluid. The piston may be translationally guided within the fixation element. Further, the actuating unit may be configured for manipulating a volume of the fluid chamber by translationally actuating the piston so as to move the fixation element relative to the support element. In the provided device, the piston is coupled to the fixation element by means of at least one ball or roller screw.

It has been found that, in known devices, the connection between the piston and the fixation element may be subjected to high frictional forces and therefore may be prone to wear. Thus, for increasing its operational safety and durability, the proposed device is equipped with at least one ball or roller screw for structurally connecting and supporting the piston relative to the fixation element. In other words, the at least one ball or roller screw may constitute a structural connection between the piston and the fixation element. In this way, frictional forces acting on the piston and/or the fixation element may be significantly reduced during operation of the device. As a result, the piston and/or the fixation element may be prevented from being exerted to a higher level of wear, thereby increasing the device's operational safety and durability.

Generally, the proposed device may be used, for example, in the field of steel constructions and various engine design applications, but is not limited to these applications. Rather, the proposed device may be used in any application in which connecting elements are tightened by employing torque-free tensioning methods. In one example, the proposed device may be used to fasten a turbo charger to an engine crank case.

Specifically, the device may be used for tensioning and/or loosening a connecting element. In other words, the device may be used to preload and/or untighten a connecting element. The connecting element may be a tensable connecting element. For example, the connecting element may be or comprise a screw, a bolt and/or any other type of tensable connecting elements.

Further, the connecting element to be tensioned and/or loosened by the proposed device may be intended and/or configured to tighten a component to which it is fastened.

Alternatively or additionally, the connecting element to be tensioned and/or loosened by the proposed device may be intended and/or configured for connecting, i.e. form- and/or force-fittingly connecting, a first component to a second component. Accordingly, the device may be configured for tensioning a connecting element for connecting a first component to a second component. For doing so, a first end of the connecting element may be fixed to the first component, i.e. by means of a threaded connection. For example, the first component may be an engine crank case and the second element may be a turbo charger mount.

As set forth above, the device may comprise the fixation element connectable to the connecting element. In other words, the fixation element may be configured for being connected to the connecting element, i.e. in a force- and/or form-fitting manner. For doing so, the fixation element may comprise a fixation section for engaging with the connecting element, in particular in a force- and/or form-fitting manner. Specifically, the fixation section may be engaged with the connecting element by means of a threaded connection. The fixation section may be provided at an end portion of the fixation element. Further, the fixation section may be configured to engage with a second end of the connecting element arranged opposed to the first end thereof. For example, the fixation section may be provided with a thread designed complementary to a thread formed at the second end of the connecting element.

More specifically, the fixation element may be provided with a recess, i.e. a cylindrical recess, which forms the fixation section. The recess may be provided at a front end of the fixation element. The fixation section may comprise at least one side wall formed by the recess which is connectable to the connecting element in a force- and/or form-fitting manner. For example, the at least one side wall of the recess may be provided such that it includes internal threads formed on an inner surface to engage with complementary threads formed at the second end of the connecting element.

The device may further comprise the support element configured to support the fixation element against the component to be tightened. In other words, the support element is configured to, during the tensioning operation of the device, abut on the component to be tightened, i.e. on the first or the second component. In this way, the support element is capable of generating a force, i.e. a reaction force, counteracting the pulling force exerted onto the connecting element connected to the fixation element during tensioning operation of the device.

The support element may be designed to translationally guide the fixation element. In other words, the fixation element may be translationally movable relative to the support element, i.e. along a longitudinal axis of the device, and thus relative to the component to be tightened.

Upon translationally moving the fixation element relative to the support element, a tensioning force may be applied to or may be removed from the connecting element fixed to the fixation element. Thus, the device may be provided such that the fixation element is translationally movable relative to the support element so as to apply a tension to or to remove a tension from the connecting element.

The device may be provided such that the fixation element, at least partly, is accommodated within the support element. For example, the support element may be provided with a cavity, i.e. a cylindrical cavity which particularly extends along the longitudinal axis of the device. The cavity may be configured to at least partially receive the fixation element, i.e. the fixation section thereof.

The device may further comprise the actuating unit for actuating the fixation element relative to the support element. Specifically, the actuating unit may be configured for translationally moving the fixation element relative to the support element and thus relative to the component to be tightened.

The actuating unit may be a hydraulic actuating unit. This means that the actuating unit may use a hydraulic fluid for actuating the fixation element. In other words, a fluid is used to transfer motive power for the fixation element so as to move the fixation element relative to the component to be tightened and thus relative to the support element. For doing so, the actuating unit may comprise the fluid chamber for receiving the fluid, which may be a hydraulic fluid.

As set forth above, the actuating unit is configured to manipulate the volume of the fluid chamber so as to move the fixation element relative to the support element. For manipulating the volume of the fluid chamber, the actuating unit may comprise the piston which is accommodated within and movable relative to the fixation element. Specifically, the actuating unit may be provided such that a translational movement of the piston manipulates a volume of the fluid chamber and thereby moves the fixation element with respect to the support element and thus with respect to the component to be tightened.

The piston is configured to define, i.e. partially define, the fluid chamber. The fluid chamber may be further defined or delimited by the fixation element and/or the support element. In other words, the fluid chamber may, at least partly, be provided in a space between the piston and/or the fixation element and/or the support element.

In a further development, the piston may comprise an actuating section and a piston section. The actuating section and the piston section may be arranged opposed and/or adjacent to one another. In other words, the actuating section and the piston section may be arranged in the region and may be formed by opposed end portions of the piston. According to one configuration, the piston may be provided in the form of an integral component, i.e. manufactured by molding or forming methods. Alternatively, the piston may be provided in the form of an assembly built up from at least two components, i.e. the actuating section and the piston section, engaged with one another.

The piston section may be provided for defining the fluid chamber. In other words, the piston section may form a part of the piston which, at least partially, delimits and defines the fluid chamber.

The actuating section may be provided for actuating the piston section. Specifically, the actuating section may be intended for being operated by an operator, i.e. by hand or by means of an electric or manual screwdriver, so as to translationally move the piston section. Thus, the actuating section may constitute a user interface of the actuating unit for receiving an input force or torque so as to operate the device. For example, the actuating section may be provided with an interface element intended for receiving the input torque exerted by the operator. The interface element may be provided at an end portion of the actuating section and may protrude from an outer surface of the device so as to ensure good accessibility for the operator.

Specifically, the interface element may be designed and intended to be manually operated by the operator, i.e. by hand. Accordingly, the interface element may be provided in the form of a handle ensuring a good grasp. For improving the operability of the device for a user, the handle may have a diameter greater compared to a shaft portion of the actuating section arranged adjacent to the interface element.

Alternatively, the interface element may be designed and intended for engagement with a tool, i.e. an electric or manual screwdriver.

For example, the actuating unit may be configured for translating a rotational movement applied to the actuating section into at least a translational movement of the fixation element relative to the component to be tightened and thus relative to the support element. In other words, in the actuating unit, the actuating section and the piston section may be arranged and interlinked to one another such that a rotational movement of the actuating section causes a translational movement of the piston section, i.e. along the device's longitudinal axis. This movement may manipulate the volume of the fluid chamber so as to move the fixation element relative to the component to be tightened. In this configuration, the actuating unit may be configured to lock a relative rotational movement between the piston section and the fixation element, i.e. upon actuation of the piston. In this way, wear on a contact surface or on seals between the piston and the fixation element may be reduced.

Specifically, the at least one ball or roller screw may be provided for interlinking the piston, i.e. its actuating section and/or piston section, and the fixation element. In this configuration, the ball or roller screw may act as a linear actuator, i.e. for enabling that a rotational movement of the actuating section is translated into a translational movement of the piston section.

According to one configuration, the piston, i.e. its actuating section, may be connected to the fixation element by means of a ball or roller screw. Specifically, the ball or roller screw may be interposed between the fixation element and the piston, in particular the actuating section. For example, the ball or roller screw may be arranged adjacent and/or directly connected to both the actuating section and the fixation element.

For coupling the fixation element and the piston by means of the ball or roller screw, the fixation element may be provided with a recess, in particular a through hole, for accommodating the ball or roller screw. In this configuration, the piston, i.e. its actuating section, may be received in the ball or roller screw. The ball or roller screw may be fixed to an inner side wall of the recess provided in the fixation element. More specifically, a nut of the ball or roller screw may be fixed to the inner side wall of the recess. Further, the piston, in particular its actuating section, may be arranged or extend through the nut. The piston, in particular its actuating section, may form or constitute the screw of the ball or roller screw. For doing so, the piston, in particular its actuating section, at least partly, may be provided with a helical thread which, in particular together with a complementary helical thread provided in the nut, forms the helical raceway for the ball bearings of the ball screw or for the planetary threaded rollers of the roller screw.

The fixation element may comprise a cap mounted to a main body of the fixation element. For example, the cap may be firmly fixed to the main body by means of a releasable form- or force-fit connection, in particular a threaded connection, or by means of a press-fit connection. By being provided with the cap, the assembly or disassembly of the device may be simplified for an operator. In this configuration, the cap may be provided with the recess.

Alternatively or additionally, the actuating section may be connected to the piston section by means of a further ball or roller screw. In this configuration, the further ball or roller screw may act as a linear actuator for enabling that, upon rotationally actuating the actuating section, the piston section is translationally moved relative to the fixation element. In other words, by interlinking the actuating section and the piston section by means of the further ball or roller screw, it is enabled that a rotational movement of the actuating section is translated or transformed into a translational movement of the piston section.

Specifically, the further ball or roller screw may be interposed between the actuating section and the piston section. The further ball or roller screw may be arranged such that it is arranged adjacent to and/or is directly connected to both the actuating section and the piston section.

For example, the piston section, in particular at a rod end thereof, may be provided with a further recess for accommodating the further ball or roller screw. Accordingly, a nut of the further ball or roller screw may be mounted to an inner side wall of the further recess. The actuating section may be accommodated in and/or protrude from the further ball or roller screw. Further, the actuating section may form or constitute a screw of the further ball or roller screw. For doing so, the actuating section, in particular at an end portion being arranged opposed to the interface element, may be provided with a helical thread which, in particular together with a complementary helical thread provided in the nut of the further ball or roller screw, forms the helical raceway for the ball bearings of the ball screw or for the planetary threaded rollers of the roller screw.

Alternatively, the actuating section, in particular at an end portion being arranged opposed to the interface element, may be provided with a further recess for accommodating the further ball or roller screw. Accordingly, a nut of the further ball or roller screw may be mounted to an inner side wall of the further recess. The piston section, in particular an end portion thereof, may be accommodated within and protrude from the further ball or roller screw. Further, the piston section may form or constitute a screw of the further ball or roller screw. For doing so, the piston section, in particular at a rod end, may be provided with a helical thread which, in particular together with a complementary helical thread provided in the nut of the further ball or roller screw, forms the helical raceway for the ball bearings of the ball screw or for the planetary threaded rollers of the roller screw.

INDUSTRIAL APPLICABILITY

The proposed device 10 may be used for fastening and/or loosening a tensable connecting element 12 to components to be tightened. The device 10 may be used in different fields of application, such as in steel constructions or engine design applications. In the following, the use of the device 10 for tightening and loosening a screw connection is described in more detail.

To connect a first component 18, e.g. a crank case, to a second component 20, e.g. a turbo charger mount, using a device 10 as shown in FIG. 1, the second component 20 is positioned next to the first component 18 and a connecting element 12 in the form of a screw is guided through a hole in the second component 20 and connected to the first component 18 by means of a threaded connection. As a result, the connecting element 12 extends from a side of the second component 20 which faces away from the first component 18. A nut 22 is screwed on the connecting element 12 from a first end 14 of the connecting element 12 which is arrange opposite to a second end 16 of the connecting element 12 positioned in and fastened to the first component 18.

Then, the device 10 is positioned over the connecting element 12 such that the connecting element 12 is housed by the support element 40. The support element 40 is placed on the second component 20. The fixation element 24 is positioned to introduce the connecting element 12 into the recess 32 to establish a threaded connection between the fixation element 24 and the first end 14 of the connecting element 12.

To apply a tension force to the connecting element 12, the actuating section 84, i.e. the interface element 98, is rotationally actuated by using an electric or manual screwdriver. In this way, the piston 48 is translationally actuated relative to the fixation element 24 in a direction facing away from the second component 20. By moving the piston 48 in this direction, i.e. upwards, the piston portion 52 of the fluid chamber 50 decreases and hydraulic fluid is pushed therefrom into the effective portion 54 of the fluid chamber 50 via the connecting bores 56. As a result, the effective portion 54 increases in volume thereby exerting a pressure on the fixation element 24 which moves the same along the longitudinal axis 42 of the device 10 in respect to the support element 40. Accordingly, a distance between the fixation element 24 and the first and the second component 18, 20 increases, thereby tensioning and thus lengthening the connecting element 12.

In this tensioned condition of connecting element 12, for retaining the tension on the connecting element 12, the nut 22 is further tightened on the connecting element until the nut 22 abuts on the second component 20. This is performed by reaching through openings in the support element 40 with a tool, such as a stick, which end may be inserted in openings at the side of the nut 22 to turn the nut 22 on the connecting element 12 from the side.

For loosening a screw connection formed by the connecting element 12 and the nut 22, which was fastened by device 10 as described above, the support element 40 is positioned around the connecting element 12 on the second component 20. The exposed first end 14 of the connecting element 12 is fixed to the fixation element 24 by introducing the first end 14 of the connecting element in the recess 32 of the fixation element and connecting the first end 14 of the connecting element 12 with the fixation element 24 by a threaded engagement by means of complementary threads formed at the recess 32 of the fixation element 24 and the first end 14 of the connecting element 12.

To apply a tension force to the connecting element 12, the actuating section 84 is rotationally actuated by using an electric or manual screwdriver. As a result, the piston 48 is translationally actuated relative to the fixation element 24 in a direction facing away from the second component 20. By moving the piston 48 in this direction, i.e. upwards, the piston portion 52 of the fluid chamber 50 decreases and hydraulic fluid is pushed therefrom into the effective portion 54 of the fluid chamber 50 via the connecting bores 56. As a result, the effective portion 54 increases in volume thereby exerting a pressure on the fixation element 24 which moves the same along the longitudinal axis 42 of the device 10 in respect to the support element 40. Accordingly, a distance between the fixation element 24 and the first and the second component 18, 20 increases, thereby tensioning and thus lengthening the connecting element 12.

In a further step, the nut 22 positioned on the connecting element 12 is loosened using a tool reaching through an opening in the support element 40. After loosening the nut 22, the tension force applied to the connection element 12 is removed by rotationally actuating the actuating section 84 in a direction that is reversed compared to the rotational actuation of the same for generating the tension force as described above. As a result, the piston 48 is moved towards the second component 20, thereby increasing the piston portion 52 of the fluid chamber 50. Further, the effective portion 54 of the fluid chamber 50 decreases and the fixation element 24 moves towards the second component 20 and release the tension acting on the connecting element 12. Thereafter, the connecting element 12 is released from the fixation element 24, thereby removing the device 10 from the connecting element 12 and the first and second component 18, 20.

The invention claimed is:

1. A device for tensioning a connecting element fastened to a component to be tightened, comprising:
    a fixation element for holding the connecting element;
    a support element for supporting the device against the component; and
    an actuating unit with a fluid chamber for receiving a fluid and a piston which is translationally guided in the fixation element, wherein the actuating unit is configured for manipulating a volume of the fluid chamber by translationally actuating the piston so as to move the fixation element relative to the support element;
    characterized in that
        the piston is coupled to the fixation element by means of at least one ball or roller screw, the at least one ball or roller screw includes a first ball or roller end having a first thread in a left hand thread and a second ball or roller end having a second thread to enable controlled and precise tensioning and loosening movements of the piston relative to the fixation element;
        the first ball or roller end connects an actuating section of the piston to the fixation element and the second ball or roller end engages a piston section to the actuating section.

2. The device according to claim 1, wherein the piston partially delimits the fluid chamber.

3. The device according to claim 1, wherein the piston comprises an actuating section and a piston section, and wherein the actuating unit is configured to transform a rotational movement of the actuating section into a translational movement of the piston section.

4. The device according to claim 3, wherein the actuating unit is configured to lock a relative rotational movement between the piston section and the fixation element.

5. The device according to claim 3, wherein the actuating section is engaged with the piston section by means of a further ball or roller screw.

6. The device according to claim 5, wherein the further ball or roller screw is interposed between the actuating section and the piston section.

7. The device according to claim 5, wherein the piston section, in particular at a rod end thereof, is provided with a further recess for accommodating the further ball or roller screw, in which the actuating section is received.

8. The device according to claim 7, wherein a further nut of the further ball or roller screw is fixed to an inner side wall of the further recess, and wherein the actuating section forms a screw of the further ball or roller screw.

9. The device according to claim 5, wherein the actuating section is provided with a further recess for accommodating the further ball or roller screw, in which the piston section is received.

10. The device according to claim 9, wherein a further nut of the further ball or roller screw is fixed to an inner side wall of the further recess, and wherein the piston section forms a screw of the further ball or roller screw.

11. The device according to claim 1, wherein a ball or roller screw is interposed between the fixation element and the piston, in particular its actuating section.

12. The device according to claim 11, wherein the fixation element is provided with a recess for accommodating the ball or roller screw, in which the piston, in particular its actuating section, is received.

13. The device according to claim 12, wherein a nut of the ball or roller screw is fixed to an inner side wall of the recess, and wherein the piston, in particular its actuating section, forms a screw of the ball or roller screw.

14. The device according to claim 12, wherein the fixation element comprises a cap mounted to a main body of the fixation element, and wherein the cap is provided with the recess for accommodating the ball or roller screw.

\* \* \* \* \*